(12) United States Patent
Beall et al.

(10) Patent No.: US 11,708,299 B2
(45) Date of Patent: Jul. 25, 2023

(54) TRANSPARENT BETA-QUARTZ GLASS CERAMICS

(71) Applicant: CORNING INCORPORATED, Corning, NY (US)

(72) Inventors: George Halsey Beall, Big Flats, NY (US); Qiang Fu, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/537,760

(22) Filed: Nov. 30, 2021

(65) Prior Publication Data

US 2022/0169560 A1    Jun. 2, 2022

Related U.S. Application Data

(60) Provisional application No. 63/119,072, filed on Nov. 30, 2020.

(51) Int. Cl.
*C03C 10/00* (2006.01)

(52) U.S. Cl.
CPC ...... *C03C 10/0009* (2013.01); *C03C 10/0027* (2013.01); *C03C 10/0054* (2013.01); *C03C 2201/02* (2013.01)

(58) Field of Classification Search
CPC ............ C03C 10/0009; C03C 10/0027; C03C 10/0054; C03C 2201/02; C03C 21/002; C03C 3/085
See application file for complete search history.

(56) References Cited

U.S. PATENT DOCUMENTS

| | | | |
|---|---|---|---|
| 3,573,076 | A | 3/1971 | Rittler |
| 4,018,612 | A | 4/1977 | Chyung |
| 6,124,223 | A | 9/2000 | Beall et al. |
| 8,143,179 | B2 | 3/2012 | Aitken et al. |
| 9,809,488 | B2 | 11/2017 | Beall et al. |
| 2021/0130225 | A1 | 5/2021 | Beall et al. |

OTHER PUBLICATIONS

ASTM C1499-09(2013), entitled "Standard Test Method for Monotonic Equibiaxial Flexural Strength of Advanced Ceramics at Ambient Temperature".
ASTM standard C770-16, entitled "Standard Test Method for Measurement of Glass Stress-Optical Coefficient".
Beall et al., "Glass-ceramic technology", 2nd Edition, John Wiley & Sons, 2019, 19 pages.
Pinckney et al.,, "Nanophase glass-ceramics", Journal of the American Ceramic Society, vol. 82, No. 1, 1999, pp. 5-16.
Rittler et al., "Crystallization and Chemical Strengthening of Stuffed ß-Quartz Glass-Ceramics", Journal of the American Ceramic Society, vol. 50, No. 4, 1967, pp. 181-190.
(Continued)

*Primary Examiner* — Karl E Group
*Assistant Examiner* — Cameron K Miller

(57) ABSTRACT

A transparent β-quartz glass ceramic is provided. The glass ceramic includes a primary crystal phase including a β-quartz solid solution, a secondary crystal phase including tetragonal $ZrO_2$, and a lithium aluminosilicate amorphous phase. The glass ceramic may be ion exchanged utilizing molten nitrate salt baths. Methods for producing the glass ceramic are also provided.

24 Claims, 9 Drawing Sheets

(56) References Cited

OTHER PUBLICATIONS

Smith et al., "Nature-inspired design of strong, tough glass-ceramics", MRS Bulletin, vol. 42, No. 3, 2017, pp. 220-225.
G.H. Beall, D.A. Duke; Transparent Glass-Ceramics; Journal of Materials Science; (1969); pp. 340-352; vol. 4.
International Search Report and Written Opinion of the International Searching Authority; PCT/US2021/060314 dated Mar. 22, 2022, 12 pages; European Patent Office.

TRANSPARENT BETA-QUARTZ GLASS CERAMICS

This application claims the benefit of priority of U.S. Provisional Application Ser. No. 63/119,072 filed on Nov. 30, 2020 the content of which is relied upon and incorporated herein by reference in its entirety.

BACKGROUND

Field

The present specification generally relates to transparent glass ceramic compositions. More specifically, the present specification is directed to transparent β-quartz glass ceramics that may be formed into cover glass or housings for electronic devices.

Technical Background

Portable electronic devices, such as, smartphones, tablets, and wearable devices (such as, for example, watches and fitness trackers) continue to get smaller and more complex. As such, materials that are conventionally used on at least one external surface of such portable electronic devices also continue to get more complex. For instance, as portable electronic devices get smaller and thinner to meet consumer demand, the display covers and housings used in these portable electronic devices also get smaller and thinner, resulting in higher performance requirements for the materials used to form these components.

Glass ceramic materials that have high transparency are attractive for such applications due to their high mechanical strength. Exemplary glass ceramic materials are those which incorporate a β-quartz solid solution crystal phase and exhibit high transparency. β-quartz solid solution glass ceramics that include magnesium in the crystal phase may be chemically strengthened through ion exchange. The ion exchange occurs as lithium ions from a molten salt bath exchange for the magnesium ions in the β-quartz solid solution crystal phase. Due to the mobility of $Mg^{2+}$ ions, a high temperature bath (>700° C.) is required. Such high temperature baths are costly.

Accordingly, a need exists for β-quartz solid solution glass ceramic materials that may be strengthened by lower cost means.

SUMMARY

According to aspect (1), a glass ceramic article is provided. The glass ceramic article comprises: a primary crystal phase comprising β-quartz solid solution; a secondary crystal phase comprising tetragonal $ZrO_2$; and a lithium aluminosilicate amorphous phase, wherein the molar ratio $(R_2O+R'O)/Al_2O_3$ is from greater than or equal to 0.9 to less than or equal to 1.3, $R_2O$ is $Li_2O+Na_2O+K_2O+Cs_2O+Rb_2O$, and R'O is $MgO+CaO+SrO+BaO+ZnO$.

According to aspect (2), the glass ceramic article of aspect (1) is provided, wherein the glass ceramic has a crystallinity of greater than 50 wt %.

According to aspect (3), the glass ceramic article of any of aspect (1) to the previous aspect is provided, wherein the primary crystal phase has a crystallite size of from greater than or equal to 50 nm to less than or equal to 100 nm.

According to aspect (4), the glass ceramic article of any of aspect (1) to the previous aspect is provided, wherein the glass ceramic has a transmittance of greater than or equal to 90% at a thickness of 0.8 mm over a wavelength range of 400 nm to 750 nm.

According to aspect (5), the glass ceramic article of any of aspect (1) to the previous aspect is provided, comprising greater than or equal to 65 mol % to less than or equal to 80 mol % $SiO_2$.

According to aspect (6), the glass ceramic article of any of aspect (1) to the previous aspect is provided, comprising greater than or equal to 8 mol % to less than or equal to 20 mol % $Al_2O_3$.

According to aspect (7), the glass ceramic article of any of aspect (1) to the previous aspect is provided, comprising greater than or equal to 4 mol % to less than or equal to 18 mol % MgO.

According to aspect (8), the glass ceramic article of any of aspect (1) to the previous aspect is provided, comprising greater than or equal to 0 mol % to less than or equal to 4 mol % ZnO.

According to aspect (9), the glass ceramic article of any of aspect (1) to the previous aspect is provided, comprising greater than or equal to 1 mol % to less than or equal to 4 mol % $ZrO_2$.

According to aspect (10), the glass ceramic article of any of aspect (1) to the previous aspect is provided, comprising greater than or equal to 0 mol % to less than or equal to 0.4 mol % $SnO_2$.

According to aspect (11), the glass ceramic article of any of aspect (1) to the previous aspect is provided, comprising greater than or equal to 0 mol % to less than or equal to 1 mol % $TiO_2$.

According to aspect (12), the glass ceramic article of any of aspect (1) to the previous aspect is provided, wherein the glass ceramic is substantially free of $TiO_2$.

According to aspect (13), the glass ceramic article of any of aspect (1) to the previous aspect is provided, wherein the glass ceramic is substantially free of $Bi_2O_3$ and $B_2O_3$.

According to aspect (14), the glass ceramic article of any of aspect (1) to the previous aspect is provided, wherein the molar ratio $(R_2O+R'O)/Al_2O_3$ is from greater than or equal to 0.9 to less than or equal to 1.1.

According to aspect (15), the glass ceramic article of any of aspect (1) to the previous aspect is provided, wherein the molar ratio $(R_2O+R'O)/Al_2O_3$ is from greater than or equal to 0.9 to less than or equal to 1.0.

According to aspect (16), the glass ceramic article of any of aspect (1) to the previous aspect is provided, comprising greater than or equal to 2 mol % to less than or equal to 8 mol % $Li_2O$.

According to aspect (17), the glass ceramic article of any of aspect (1) to the previous aspect is provided, comprising: greater than or equal to 0 mol % to less than or equal to 5 mol % $Na_2O$; and greater than or equal to 0 mol % to less than or equal to 5 mol % $K_2O$.

According to aspect (18), the glass ceramic article of any of aspect (1) to the previous aspect is provided, comprising a compressive stress layer extending from a surface to a depth of compression.

According to aspect (19), the glass ceramic article of aspect (18) is provided, wherein the depth of compression is greater than or equal to 10 μm.

According to aspect (20), the glass ceramic article of any of aspect (18) to the previous aspect is provided, wherein the depth of compression is less than or equal to 60 μm.

According to aspect (21), the glass ceramic article of any of aspect (18) is provided, wherein the depth of compression is less than or equal to 0.2t, where t is a thickness of the glass ceramic article.

According to aspect (22), the glass ceramic article of any of aspect (18) to the previous aspect is provided, wherein the compressive stress layer comprises a compressive stress greater than or equal to 100 MPa.

According to aspect (23), a consumer electronic product is provided. The consumer electronic product comprises: a housing comprising a front surface, a back surface and side surfaces; electrical components at least partially within the housing, the electrical components comprising a controller, a memory, and a display, the display at or adjacent the front surface of the housing; and a cover substrate disposed over the display, wherein at least a portion of at least one of the housing or the cover substrate comprises the glass ceramic article of any of aspect (1) to the previous aspect.

According to aspect (24), a method of producing a glass ceramic article is provided. The method comprises: nucleating a glass substrate to form a nucleated glass substrate; ceramming the nucleated glass substrate to form a glass ceramic article, wherein the glass substrate comprises a lithium aluminosilicate, and the glass ceramic article comprises: a primary crystal phase comprising β-quartz solid solution; a secondary crystal phase comprising tetragonal $ZrO_2$; and a lithium aluminosilicate amorphous phase, wherein the molar ratio $(R_2O+R'O)/Al_2O_3$ is from greater than or equal to 0.9 to less than or equal to 1.3, $R_2O$ is $Li_2O+Na_2O+K_2O+Cs_2O+Rb_2O$, and R'O is $MgO+CaO+SrO+BaO+ZnO$.

According to aspect (25), the method of aspect (24) is provided, wherein the nucleating comprises treatment in an environment at a temperature greater than or equal to 700° C. to less than or equal to 800° C.

According to aspect (26), the method of any of aspect (24) to the previous aspect is provided, wherein the nucleating extends for a time period of greater than or equal to 10 minutes to less than or equal to 12 hours.

According to aspect (27), the method of any of aspect (24) to the previous aspect is provided, wherein the ceramming comprises treatment in an environment at a temperature greater than or equal to 900° C. to less than or equal to 1000° C.

According to aspect (28), the method of any of aspect (24) to the previous aspect is provided, wherein the ceramming extends for a time period of greater than or equal to 10 minutes to less than or equal to 4 hours.

According to aspect (29), the method of any of aspect (24) to the previous aspect is provided, further comprising an intermediate heat treatment of the nucleated glass substrate, wherein the intermediate heat treatment takes place after the nucleating and before the ceramming and comprises treatment in an environment at a temperature greater than the nucleating and less than the ceramming.

According to aspect (30), the method of aspect (29) is provided, wherein the intermediate heat treatment comprises treatment in an environment at a temperature greater than or equal to 800° C. to less than or equal to 900° C.

According to aspect (31), the method of any of aspect (29) to the previous aspect is provided, wherein the intermediate heat treatment extends for a time period of greater than or equal to 10 minutes to less than or equal to 4 hours.

According to aspect (32), the method of any of aspect (24) to the previous aspect is provided, further comprising ion exchanging the glass ceramic article in a molten salt bath, wherein the molten salt bath comprises $NaNO_3$, $KNO_3$, or combinations thereof.

According to aspect (33), the method of aspect (32) is provided, wherein the molten salt bath is at a temperature of greater than or equal to 350° C. to less than or equal to 550° C.

According to aspect (34), the method of any of aspect (32) to the previous aspect is provided, wherein the ion exchanging extends for a time period greater than or equal to 30 minutes to less than or equal to 24 hours.

According to aspect (35), the method of any of aspect (24) to the previous aspect is provided, wherein the glass substrate comprises: greater than or equal to 65 mol % to less than or equal to 80 mol % $SiO_2$; than or equal to 8 mol % to less than or equal to 20 mol % $Al_2O_3$; greater than or equal to 2 mol % to less than or equal to 8 mol % $Li_2O$; greater than or equal to 4 mol % to less than or equal to 18 mol % MgO; greater than or equal to 0 mol % to less than or equal to 4 mol % ZnO; greater than or equal to 1 mol % to less than or equal to 4 mol % $ZrO_2$; and greater than or equal to 0 mol % to less than or equal to 0.4 mol % $SnO_2$, wherein the molar ratio $(R_2O+R'O)/Al_2O_3$ is from greater than or equal to 0.9 to less than or equal to 1.3.

According to aspect (36), the method of any of aspect (24) to the previous aspect is provided, wherein the molar ratio $(R_2O+R'O)/Al_2O_3$ is from greater than or equal to 0.9 to less than or equal to 1.1.

According to aspect (37), the method of any of aspect (24) to the previous aspect is provided, wherein the glass substrate comprises: greater than or equal to 0 mol % to less than or equal to 1 mol % $TiO_2$, wherein the glass substrate is substantially free of $Bi_2O_3$ and $B_2O_3$.

According to aspect (38), a glass is provided. The glass comprises: greater than or equal to 65 mol % to less than or equal to 80 mol % $SiO_2$; than or equal to 8 mol % to less than or equal to 20 mol % $Al_2O_3$; greater than or equal to 2 mol % to less than or equal to 8 mol % $Li_2O$; greater than or equal to 4 mol % to less than or equal to 18 mol % MgO; greater than or equal to 0 mol % to less than or equal to 4 mol % ZnO; greater than or equal to 1 mol % to less than or equal to 4 mol % $ZrO_2$; greater than or equal to 0 mol % to less than or equal to 0.4 mol % $SnO_2$; and greater than or equal to 0 mol % to less than or equal to 1 mol % $TiO_2$; wherein the molar ratio $(R_2O+R'O)/Al_2O_3$ is from greater than or equal to 0.9 to less than or equal to 1.3, $R_2O$ is $Li_2O+Na_2O+K_2O+Cs_2O+Rb_2O$, and R'O is $MgO+CaO+SrO+BaO+ZnO$, and the glass is substantially free of $Bi_2O_3$ and $B_2O_3$.

According to aspect (39), the glass of aspect (38) is provided, wherein the glass is substantially free of $TiO_2$.

According to aspect (40), the glass of any of aspect (38) to the previous aspect is provided, wherein the molar ratio $(R_2O+R'O)/Al_2O_3$ is from greater than or equal to 0.9 to less than or equal to 1.1.

According to aspect (41), the glass of any of aspect (38) to the previous aspect is provided, wherein the molar ratio $(R_2O+R'O)/Al_2O_3$ is from greater than or equal to 0.9 to less than or equal to 1.0.

According to aspect (42), the glass of any of aspect (38) to the previous aspect is provided, comprising greater than or equal to 0 mol % to less than or equal to 5 mol % $Na_2O$.

According to aspect (43), the glass of any of aspect (38) to the previous aspect is provided, comprising greater than or equal to 0 mol % to less than or equal to 5 mol % $K_2O$.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate the various embodiments described herein and, together with the description, serve to explain the principles and operations of the claimed subject matter.

DETAILED DESCRIPTION

Figure 1:
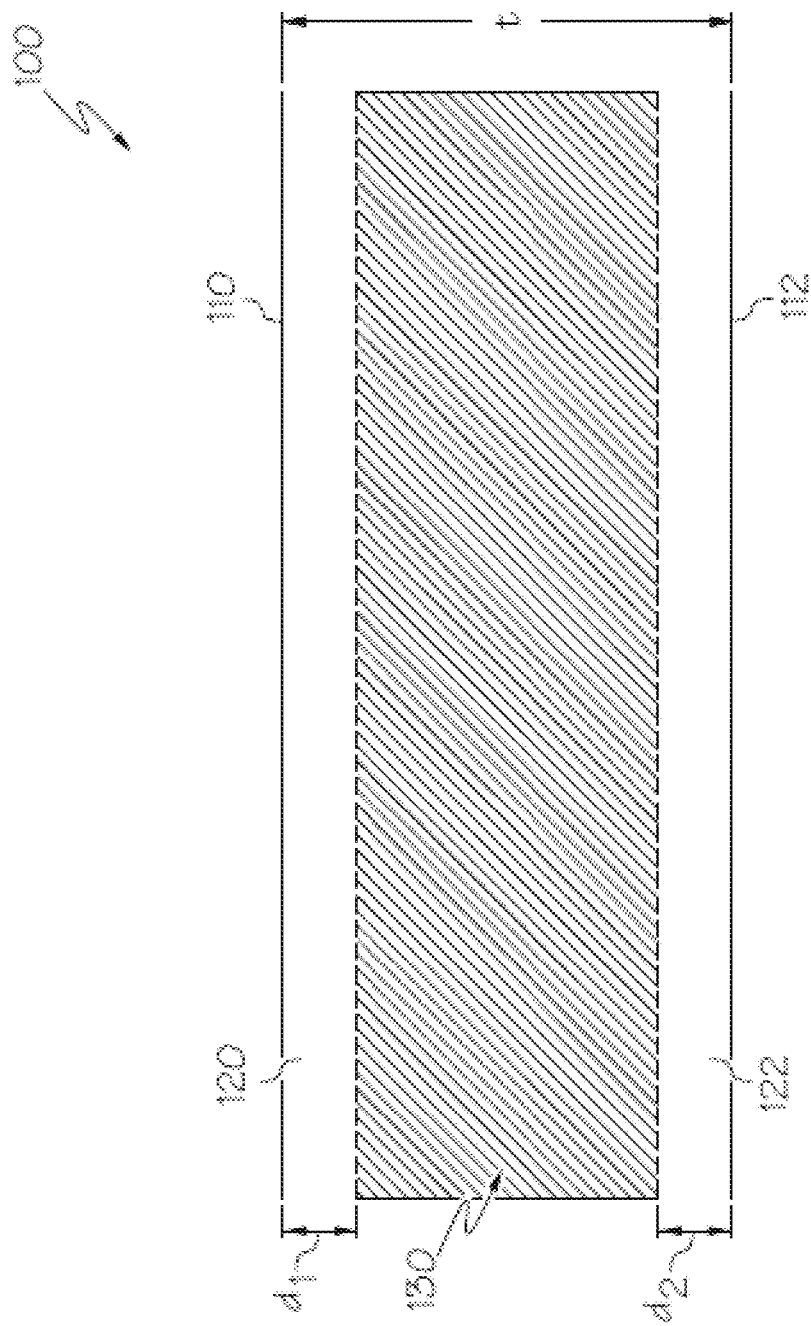
FIG. 1 schematically depicts a cross section of a glass ceramic having compressive stress layers on surfaces thereof according to embodiments disclosed and described herein.

Reference will now be made in detail to transparent β-quartz glass ceramics according to various embodiments. In particular, the transparent β-quartz glass ceramics may be ion exchanged utilizing molten nitrate salt baths. Therefore, the transparent gahnite-spinel glass ceramics are suited for use as display covers and housings in portable electronic devices.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. Whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

Unless otherwise specified, all compositions of the glasses described herein are expressed in terms of mole percent (mol %), and the constituents are provided on an oxide basis. Unless otherwise specified, all temperatures are expressed in terms of degrees Celsius (° C.).

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. For example, a composition that is "substantially free of $K_2O$" is one in which $K_2O$ is not actively added or batched into the composition, but may be present in very small amounts as a contaminant, such as in amounts of less than about 0.01 mol %. As utilized herein, when the term "about" is used to modify a value, the exact value is also disclosed.

The glass ceramics described herein contain a primary crystal phase, a secondary crystal phase, and a residual amorphous (glass) phase. The primary crystal phase is the predominant crystal phase, defined herein as the crystal phase that accounts for the largest fraction of the glass ceramic by weight. Accordingly, the secondary crystal phase may be present in an amount of the glass ceramic that is less than the amount of the primary crystal phase, and the amounts the of the crystal phases in the glass ceramic may be described in terms of weight percent of the glass ceramic. In some embodiments, the glass ceramic may include additional crystal phases, such that the glass ceramic includes more than two crystal phases.

In embodiments, the primary crystal phase includes a β-quartz solid solution. The β-quartz solid solution is a β-quartz crystal structure that has been 'stuffed' with additional oxide components, such as $Al_2O_3$, MgO, and/or ZnO. It should be understood that references to a β-quartz crystal phase herein are intended to describe a β-quartz solid solution crystal phase.

The primary crystal phase may have a crystallite size that is small enough to prevent degradation of the transparency of the glass ceramic. Larger crystallite sizes may result in an opaque glass ceramic. In embodiments, the primary crystal phase has a crystallite size of less than or equal to 100 nm, such as less than or equal to 95 nm, less than or equal to 90 nm, less than or equal to 85 nm, less than or equal to 80 nm, less than or equal to 75 nm, less than or equal to 70 nm, less than or equal to 65 nm, less than or equal to 60 nm, less than or equal to 55 nm, or less. In embodiments, the primary crystal phase has a crystallite size of greater than or equal to 50 nm, such as greater than or equal to 55 nm, greater than or equal to 60 nm, greater than or equal to 65 nm, greater than or equal to 70 nm, greater than or equal to 75 nm, greater than or equal to 80 nm, greater than or equal to 85 nm, greater than or equal to 90 nm, greater than or equal to 95 nm, or more. In embodiments, the primary crystal phase has a crystallite size of greater than or equal to 50 nm to less than or equal to 100 nm, such as greater than or equal to 55 nm to less than or equal to 95 nm, greater than or equal to 60 nm to less than or equal to 90 nm, greater than or equal to 65 nm to less than or equal to 85 nm, greater than or equal to 70 nm to less than or equal to 80 nm, greater than or equal to 70 nm to less than or equal to 75 nm, and any and all ranges formed from any of the foregoing endpoints. The crystallite size as used herein is determined by powder x-ray diffraction (XRD) analysis with a scan from 10 to 80 degrees 2θ, unless otherwise specified. The crystallite size was estimated by measuring the full width half maximum intensity (FWHM) and then calculated using the Scherrer equation function available in MDI Jade, the software package utilized for phase identification and quantitative analysis. As utilized herein, the crystallite size refers to an average crystallite size.

In embodiments, the secondary crystal phase includes tetragonal zirconia, which may be indicated as t-$ZrO_2$. The formation of the tetragonal $ZrO_2$ in the glass ceramic requires the presence of $ZrO_2$ in the precursor glass. Without wishing to be bound by any particular theory, it is believed that the tetragonal $ZrO_2$ crystal phase crystallizes before the β-quartz crystal phase during ceramming, and acts as a nucleation site for the β-quartz crystal phase. In some embodiments, the composition of the precursor glass and the ceramming conditions may result in a glass ceramic that includes additional crystal phases beyond those described above.

In embodiments, the total crystallinity of the glass ceramic is high enough to provide enhanced mechanical properties, such as hardness, Young's modulus, and scratch resistance, but low enough that the ion exchangeability and transparency of the glass ceramic is not degraded. As utilized herein, the total crystallinity is provided in wt % and refers to the sum of the wt % of all the crystal phases present in the glass ceramic. In embodiments, the total crystallinity is greater than or equal to 50 wt %, such as greater than or equal to 55 wt %, greater than or equal to 60 wt %, greater than or equal to 65 wt %, greater than or equal to 70 wt %, greater than or equal to 75 wt %, greater than or equal to 80 wt %, greater than or equal to 85 wt %, or more. In embodiments, the total crystallinity is less than or equal to 90 wt %, such as less than or equal to 85 wt %, less than or equal to 80 wt %, less than or equal to 75 wt %, less than or equal to 70 wt %, less than or equal to 65 wt %, less than or equal to 60 wt %, less than or equal to 55 wt %, or less. In embodiments, the total crystallinity is greater than or equal to 50 wt % to less than or equal to 90 wt %, such as greater than or equal to 55 wt % to less than or equal to 85 wt %, greater than or equal to 60 wt % to less than or equal to 80 wt %, greater than or equal to 65 wt % to less than or equal to 75 wt %, greater than or equal to 50 wt % to less than or equal to 70 wt %, and any and all ranges formed from any of the foregoing endpoints. The total crystallinity of the glass ceramic is determined through Rietveld quantitative analysis of the XRD data gathered as described above. The Rietveld analysis employs a least squares method to model the XRD data and then determine the concentration of phases in the sample based on known lattice and scale factors for the identified phases.

The glass ceramics disclosed herein are transparent. As utilized herein, a glass ceramic is considered transparent when exhibiting a transmittance of at least 80% throughout the visible wavelength range (400 nm to 750 nm). The transmittance, as utilized herein refers to total transmittance, and is measured with a Perkin Elmer Lambda 950 UV/VIS/NIR spectrophotometer with a 150 mm integrating sphere. The samples were mounted at the sphere's entrance port, allowing for collection of wide-angle scattered light. The total transmittance data was collected with the reference Spectralon reflectance disc over the sphere's exit port. The percent of total transmittance (% T) was calculated relative to an open beam baseline measurement. Unless otherwise specified, the transmittance is measured on glass ceramic articles with a thickness of 0.8 mm. In embodiments, the glass ceramic exhibits a transmittance over the visible wavelength range of greater than or equal to 80%, such as greater than or equal to 81%, greater than or equal to 82%, greater than or equal to 83%, greater than or equal to 84%, greater than or equal to 85%, greater than or equal to 86%, greater than or equal to 87%, greater than or equal to 88%, greater than or equal to 89%, greater than or equal to 90%, or more.

The composition of the glass ceramics will now be described. Components of the glass ceramics according to embodiments are discussed individually below, with reference to the composition of the precursor glass. The composition of the precursor glass is understood to be the same as the bulk composition of the glass ceramics formed therefrom, prior to any ion exchange treatment. The precursor glass compositions described herein allow the formation of a glass ceramic article that includes a lithium aluminosilicate amorphous phase, enabling ion exchange of the amorphous phase with sodium and/or potassium containing baths. The glass ceramics described herein are formed from lithium aluminosilicate precursor glasses. It should be understood that any of the variously recited ranges of one component may be individually combined with any of the variously recited ranges for any other component.

In embodiments of the glass ceramics disclosed herein, $SiO_2$ is the largest constituent. The $SiO_2$ serves as the primary glass-forming oxide for the precursor glass and stabilizes the networking structure of the precursor glass and glass ceramic. Pure $SiO_2$ has a high melting point. Accordingly, if the concentration of $SiO_2$ in the glass ceramic is too high, the formability of the precursor glass composition used to form the glass ceramics may be diminished as higher concentrations of $SiO_2$ increase the difficulty of melting the glass, which, in turn, adversely impacts the formability of the precursor glass. In embodiments, the glass composition generally comprises $SiO_2$ in an amount greater than or equal to 65 mol %, such as greater than or equal to 66 mol %, greater than or equal to 67 mol %, greater than or equal to 68 mol %, greater than or equal to 69 mol %, greater than or equal to 70 mol %, greater than or equal to 71 mol %, greater than or equal to 72 mol %, greater than or equal to 73 mol %, greater than or equal to 74 mol %, greater than or equal to 75 mol %, greater than or equal to 76 mol %, greater than or equal to 77 mol %, greater than or equal to 78 mol %, greater than or equal to 79 mol %, or more. In embodiments, the glass composition comprises $SiO_2$ in an amount less than or equal to 80 mol %, such as less than or equal to 79 mol %, less than or equal to 78 mol %, less than or equal to 77 mol %, less than or equal to 76 mol %, less than or equal to 75 mol %, less than or equal to 74 mol %, less than or equal to 73 mol %, less than or equal to 72 mol %, less than or equal to 71 mol %, less than or equal to 70 mol %, less than or equal to 69 mol %, less than or equal to 68 mol %, less than or equal to 67 mol %, less than or equal to 66 mol %, or less. In embodiments, the glass composition comprises $SiO_2$ in an amount from greater than or equal to 65 mol % to less than or equal to 80 mol %, such as greater than or equal to 66 mol % to less than or equal to 79 mol %, greater than or equal to 67 mol % to less than or equal to 78 mol %, greater than or equal to 68 mol % to less than or equal to 77 mol %, greater than or equal to 69 mol % to less than or equal to 76 mol %, greater than or equal to 70 mol % to less than or equal to 75 mol %, greater than or equal to 71 mol % to less than or equal to 74 mol %, greater than or equal to 72 mol % to less than or equal to 73 mol %, and any and all sub-ranges formed from the any of the forgoing endpoints.

The glass ceramics include $Al_2O_3$. $Al_2O_3$ may increase the viscosity of the precursor glass compositions, decreasing the formability of the glass composition when the amount of $Al_2O_3$ is too high. However, when the concentration of $Al_2O_3$ is balanced against the concentration of $SiO_2$ and the concentration of alkali oxides in the glass composition, $Al_2O_3$ can reduce the liquidus temperature of the glass melt, thereby enhancing the liquidus viscosity and improving the compatibility of the precursor glass composition with certain forming processes. The inclusion of $Al_2O_3$ also improves the mechanical properties and chemical durability of the glass ceramic. The $Al_2O_3$ in the precursor glass also supplies the aluminum necessary to form the β-quartz solid solution crystal phase when the precursor glass is cerammed to form a glass ceramic. In embodiments, the precursor glass composition comprises $Al_2O_3$ in an amount greater than or equal to 8 mol %, such as greater than or equal to 9 mol %, greater than or equal to 10 mol %, greater than or equal to 11 mol %, greater than or equal to 12 mol %, greater than or equal to 13 mol %, greater than or equal to 14 mol %, greater than or equal to 15 mol %, greater than or equal to 16 mol %, greater than or equal to 17 mol %, greater than or equal to 18 mol %, greater than or equal to 19 mol %, or more. In embodiments, the glass composition comprises $Al_2O_3$ in an amount less than or equal to 20 mol %, such as less than or equal to 19 mol %, less than or equal to 18 mol %, less than or equal to 17 mol %, less than or equal to 16 mol %, less than or equal to 15 mol %, less than or equal to 14 mol %, less than or equal to 13 mol %, less than or equal to 12 mol %, less than or equal to 11 mol %, less than or equal to 10 mol %, less than or equal to 9 mol %, or less. In embodiments, the glass composition comprises $Al_2O_3$ in an amount greater than or equal to 8 mol % to less than or equal to 20 mol %, such as greater than or equal to 9 mol % to less than or equal to 19 mol %, greater than or equal to 10 mol % to less than or equal to 18 mol %, greater than or equal to 11 mol % to less than or equal to 17 mol %, greater than or equal to 12 mol % to less than or equal to 16 mol %, greater than or equal to 13 mol % to less than or equal to 15 mol %, greater than or equal to 8 mol % to less than or equal to 14 mol %, and any and all sub-ranges formed from any of the foregoing endpoints.

The glass ceramic includes one or more alkali metal oxides. The alkali metal oxides facilitate the chemical strengthening of the glass ceramic, such as through an ion exchange process. The sum of the alkali metal oxides ($Li_2O$, $Na_2O$, $K_2O$, $Cs_2O$, and $Rb_2O$) in the glass ceramic may be referred to as "$R_2O$", and $R_2O$ may be expressed in mol %. In some embodiments, the glass ceramic may include a mixture of alkali metal oxides, such as a combination of $Li_2O$ and $Na_2O$, a combination of $Li_2O$ and $K_2O$, or a combination of $Li_2O$, $Na_2O$, and $K_2O$. Without wishing to be bound by any particular theory, it is believed that at least some of the alkali metal oxides segregate into the residual glass phase of the glass ceramic upon ceramming facilitating the ion exchange of the glass ceramic.

The glass ceramic includes lithium. The inclusion of $Li_2O$ in the glass ceramic allows for an ion exchange process and reduces the softening point of the precursor glass composition. The $Li_2O$ may partition in both the β-quartz solid solution and in the residual glass phase of the glass ceramic when the precursor glass is cerammed. In embodiments, the majority of the lithium is contained in the residual glass phase of the glass ceramic. In embodiments, the precursor glass composition comprises $Li_2O$ in an amount greater than or equal to 2 mol %, such as greater than or equal to 3 mol %, greater than or equal to 4 mol %, greater than or equal to 5 mol %, greater than or equal to 6 mol %, greater than or equal to 7 mol %, or more. In embodiments, the glass composition comprises $Li_2O$ in an amount less than or equal to 8 mol %, such as less than or equal to 7 mol %, less than or equal to 6 mol %, less than or equal to 5 mol %, less than or equal to 4 mol %, less than or equal to 3 mol %, or less. In embodiments, the glass composition comprises $Li_2O$ in an amount greater than or equal to 2 mol % to less than or equal to 8 mol %, such as greater than or equal to 3 mol % to less than or equal to 7 mol %, greater than or equal to 4 mol % to less than or equal to 6 mol %, greater than or equal to 4 mol % to less than or equal to 5 mol %, and any and all sub-ranges formed from any of the foregoing endpoints.

Like $Li_2O$, $Na_2O$ aids in the ion exchangeability of the glass ceramic, and also decreases the melting point of the precursor glass composition and improves formability of the precursor glass composition. The inclusion of $Na_2O$ may also reduce the ceramming time necessary to produce the glass ceramic. In embodiments, the precursor glass composition comprises $Na_2O$ in an amount greater than or equal to 0 mol %, such as greater than or equal to 1 mol %, greater than or equal to 2 mol %, greater than or equal to 3 mol %, greater than or equal to 4 mol %, or more. In some embodiments, the precursor glass composition comprises $Na_2O$ in an amount less than or equal to 5 mol %, such as less than or equal to 4 mol %, less than or equal to 3 mol %, less than or equal to 2 mol %, less than or equal to 1 mol %, or less. In embodiments, the precursor glass composition comprises $Na_2O$ in an amount greater than or equal to 0 mol % to less than or equal to 5 mol %, such as greater than or equal to 1 mol % to less than or equal to 4 mol %, greater than or equal to 2 mol % to less than or equal to 3 mol %, and any and all sub-ranges formed from any of the foregoing endpoints. In embodiments, the precursor glass composition is substantially free or free of $Na_2O$.

The glass ceramic and precursor glass may also include $K_2O$. The inclusion of $K_2O$ may reduce the melting temperature of the precursor glass and reduce the ceramming time necessary to produce the glass ceramic. In embodiments, the precursor glass composition comprises $K_2O$ in an amount greater than or equal to 0 mol %, such as greater than or equal to 1 mol %, greater than or equal to 2 mol %, greater than or equal to 3 mol %, greater than or equal to 4 mol %, or more. In some embodiments, the precursor glass composition comprises $K_2O$ in an amount less than or equal to 5 mol %, such as less than or equal to 4 mol %, less than or equal to 3 mol %, less than or equal to 2 mol %, less than or equal to 1 mol %, or less. In embodiments, the precursor glass composition comprises $K_2O$ in an amount greater than or equal to 0 mol % to less than or equal to 5 mol %, such as greater than or equal to 1 mol % to less than or equal to 4 mol %, greater than or equal to 2 mol % to less than or equal to 3 mol %, and any and all sub-ranges formed from any of the foregoing endpoints. In embodiments, the precursor glass composition is substantially free or free of $K_2O$.

The glass ceramics include MgO. The MgO in the precursor glass supplies the magnesium necessary to form the β-quartz solid solution crystal phase when the precursor glass is cerammed to form a glass ceramic and also improves the melting behavior of the glass. In embodiments, the amount of MgO in the precursor glass is greater than or equal to 4 mol %, such as greater than or equal to 5 mol %, greater than or equal to 6 mol %, greater than or equal to 7 mol %, greater than or equal to 8 mol %, greater than or equal to 9 mol %, greater than or equal to 10 mol %, greater than or equal to 11 mol %, greater than or equal to 12 mol %, greater than or equal to 13 mol %, greater than or equal to 14 mol %, greater than or equal to 15 mol %, greater than or equal to 16 mol %, greater than or equal to 17 mol %, or more. In embodiments, the amount of MgO in the precursor glass is less than or equal to 18 mol %, such as less than or equal to 17 mol %, less than or equal to 16 mol %, less than or equal to 15 mol %, less than or equal to 14 mol %, less than or equal to 13 mol %, less than or equal to 12 mol %, less than or equal to 11 mol %, less than or equal to 10 mol %, less than or equal to 9 mol %, less than or equal to 8 mol %, less than or equal to 7 mol %, less than or equal to 6 mol %, less than or equal to 5 mol %, or less. In embodiments, the amount of MgO in the precursor glass is greater than or equal to 4 mol % to less than or equal to 18 mol %, such as greater than or equal to 5 mol % to less than or equal to 17 mol %, greater than or equal to 6 mol % to less than or equal to 16 mol %, greater than or equal to 7 mol % to less than or equal to 15 mol %, greater than or equal to 8 mol % to less than or equal to 14 mol %, greater than or equal to 9 mol % to less than or equal to 13 mol %, greater than or equal to 10 mol % to less than or equal to 12 mol %, greater than or equal to 11 mol % to less than or equal to 18 mol %, and any and all sub-ranges formed from any of the foregoing endpoints.

The glass ceramics of embodiments may further comprise ZnO. The ZnO in the precursor glass may help form the β-quartz solid solution crystal phase when the precursor glass is cerammed to form a glass ceramic. In embodiments, the glass composition comprises ZnO in an amount greater than or equal to 0 mol %, such as greater than or equal to 1 mol %, greater than or equal to 2 mol %, greater than or equal to 3 mol %, or more. In embodiments, the glass composition comprises ZnO in an amount less than or equal to 4 mol %, such as less than or equal to 3 mol %, less than or equal to 2 mol %, less than or equal to 1 mol %, or less. In embodiments, the glass composition comprises ZnO in an amount greater than or equal to 0 mol % to less than or equal to 4 mol %, such greater than or equal to 0.5 mol % to less than or equal to 3.5 mol %, greater than or equal to 1 mol % to less than or equal to 3 mol %, greater than or equal to 1.5 mol % to less than or equal to 2.5 mol %, greater than or equal to 0.5 mol % to less than or equal to 2 mol %, and any and all sub-ranges formed from any of the foregoing endpoints. In embodiments, the precursor glass composition is substantially free or free of ZnO.

The glass ceramics include $ZrO_2$. The $ZrO_2$ acts as a nucleating agent to enable bulk nucleation of the glass ceramic. If the concentration of $ZrO_2$ is too low, the precursor glass may not crystallize to form the glass ceramic when cerammed. If the concentration of $ZrO_2$ is too high, the precursor glass may spontaneously devitrify when the precursor glass is cooled during the forming process. In addition to acting as a nucleating agent, the presence of $ZrO_2$ in the precursor glass facilitates the crystallization of tetragonal $ZrO_2$ during the ceramming process. In embodiments, the amount of $ZrO_2$ in the precursor glass is greater than 1 mol %, such as greater than 1.5 mol %, greater than 2 mol %, greater than 2.5 mol %, greater than 3 mol %, greater than 3.5 mol %, or more. In embodiments, the amount of $ZrO_2$ in the precursor glass is greater than 1 mol % to less than or equal to 4 mol %, such as greater than or equal to 1.5 mol % to less than or equal to 3.5 mol %, greater than or equal to 2 mol % to less than or equal to 3 mol %, greater than or equal to 2.5 mol % to less than or equal to 4 mol %, and any and all sub-ranges formed from any of the foregoing endpoints.

In embodiments, the glass ceramic may include $TiO_2$. The $TiO_2$ may act as an additional nucleating agent. If the content of $TiO_2$ is too high the glass ceramic may have an undesirably colored appearance. For example, glass ceramics that include $TiO_2$ may have a yellow or brown appearance even when transparent in the visible range. In embodiments, the amount of $TiO_2$ in the precursor glass is greater than or equal to 0 mol %, such as greater than or equal to 0.25 mol %, greater than or equal to 0.5 mol %, greater than or equal to 0.75 mol %, or more. In embodiments, the amount of $TiO_2$ in the precursor glass is less than or equal to 1 mol %, such as less than or equal to 0.75 mol %, less than or equal to 0.5 mol %, less than or equal to 0.25 mol %, or less. In embodiments, the amount of $TiO_2$ in the precursor glass is greater than or equal to 0 mol % to less than or equal to 1 mol %, such as greater than or equal to 0.25 mol % to less than or equal to 0.75 mol %, or greater than or equal to 0 mol % to less than or equal to 0.5 mol %, and any and all sub-ranges formed from the foregoing endpoints. In embodiments, the glass ceramic is substantially free or free of $TiO_2$.

In embodiments, the glass ceramic may additionally include BaO. The inclusion of BaO in the glass ceramic may increase the refractive index of the residual glass phase in the glass ceramic. In embodiments, the glass ceramic is substantially free or free of BaO.

In embodiments, the glass ceramic may optionally include one or more fining agents. In some embodiments, the fining agents may include, for example, tin oxide ($SnO_2$) and/or arsenic oxide. In embodiments, $SnO_2$ may be present in the precursor glass composition in an amount less than or equal to 0.4 mol %, such as from greater than or equal to 0 mol % to less than or equal to 0.3 mol %, greater than or equal to 0.1 mol % to less than or equal to 0.2 mol %, and all ranges and sub-ranges between the foregoing values. In embodiments, the glass ceramic is substantially free or free of $SnO_2$. In embodiments, the glass ceramic may be free or substantially free of one or both of arsenic and antimony.

In embodiments, the glass ceramic may be substantially free or free of $Bi_2O_3$. In embodiments, the glass ceramic may be substantially free or free of $B_2O_3$. In embodiments, the glass ceramic may be substantially free or free of $Bi_2O_3$ and $B_2O_3$.

The glass ceramics are characterized by a molar ratio between the total alkali metal oxide and divalent metal oxide content and the alumina content. The molar ratio may be represented as $(R_2O+R'O)/Al_2O_3$, wherein $R_2O$ is defined as above and R'O is the total content of MgO, CaO, SrO, BaO and ZnO in the glass ceramic. The glass ceramics, and thereby the precursor glass compositions, have a $(R_2O+R'O)/Al_2O_3$ value greater than or equal to 0.9 to less than or equal to 1.3, such as greater than or equal to 0.9 to less than or equal to 1.2, greater than or equal to 0.9 to less than or equal to 1.1, greater than or equal to 0.91 to less than or equal to 1.09, greater than or equal to 0.92 to less than or equal to 1.08, greater than or equal to 0.93 to less than or equal to 1.07, greater than or equal to 0.94 to less than or equal to 1.06, greater than or equal to 0.95 to less than or equal to 1.05, greater than or equal to 0.96 to less than or equal to 1.04, greater than or equal to 0.97 to less than or equal to 1.03, greater than or equal to 0.98 to less than or equal to 1.02, greater than or equal to 0.99 to less than or equal to 1.01, greater than or equal to 0.9 to less than or equal to 1.0, and any and all sub-ranges formed from any of the foregoing endpoints. When the $(R_2O+R'O)/Al_2O_3$ value is outside of the specified range, the transparency of the glass ceramics is undesirably degraded.

In embodiments, a precursor glass article, also referred to herein as a glass substrate, may be subjected to a ceramming process to form a glass ceramic article. In embodiments the precursor glass article has a composition including: greater than or equal to 65 mol % to less than or equal to 80 mol % $SiO_2$; than or equal to 8 mol % to less than or equal to 20 mol % $Al_2O_3$;

greater than or equal to 2 mol % to less than or equal to 8 mol % $Li_2O$; greater than or equal to 4 mol % to less than or equal to 18 mol % MgO; greater than or equal to 0 mol % to less than or equal to 4 mol % ZnO; greater than or equal to 1 mol % to less than or equal to 4 mol % $ZrO_2$; greater than or equal to 0 mol % to less than or equal to 0.4 mol % $SnO_2$; and greater than or equal to 0 mol % to less than or equal to 1 mol % $TiO_2$, wherein the molar ratio $(R_2O+R'O)/Al_2O_3$ is from greater than or equal to 0.9 to less than or equal to 1.3, and the precursor glass article is substantially free of $Bi_2O_3$ and $B_2O_3$.

From the above, glass ceramics according to embodiments may be formed from precursor glass articles formed by any suitable method, such as slot forming, float forming, rolling processes, fusion forming processes, mold forming processes, etc. A precursor glass article may be characterized by the manner in which it is formed. For instance, the precursor glass article may be characterized as float-formable (i.e., formed by a float process), down-drawable and, in particular, fusion-formable or slot-drawable (i.e., formed by a down draw process such as a fusion draw process or a slot draw process).

The glass ceramics may be formed by ceramming a precursor glass substrate under any suitable conditions. The ceramming includes a nucleation treatment for the purposes of forming crystal nuclei in the precursor glass substrate and a ceramming treatment to form the glass ceramic article. The ceramming treatment may also include an intermediate heat treatment that takes place between the nucleation treatment and the ceramming treatment.

The nucleation treatment may occur at any temperature sufficient to form a nucleated glass substrate. In embodiments the nucleation treatment occurs at temperatures of greater than or equal to 700° C., such as greater than or equal to 710° C., greater than or equal to 720° C., greater than or equal to 730° C., greater than or equal to 740° C., greater than or equal to 750° C., greater than or equal to 760° C., greater than or equal to 770° C., greater than or equal to 780° C., greater than or equal to 790° C., or more. In embodiments, the nucleation treatment occurs at temperatures of less than or equal to 800° C., such as less than or equal to 790° C., less than or equal to 780° C., less than or equal to 770° C., less than or equal to 760° C., less than or equal to 750° C., less than or equal to 740° C., less than or equal to 730° C., less than or equal to 20° C., less than or equal to 710° C., or less. In embodiments, the nucleation treatment occurs at temperatures of greater than or equal to 700° C. to less than or equal to 800° C., such as greater than or equal to 710° C. to less than or equal to 790° C., greater than or equal to about 720° C. to less than or equal to about 780° C., greater than or equal to about 730° C. to less than or equal to about 770° C., greater than or equal to about 740° C. to less than or equal to about 760° C., greater than or equal to about 750° C. to less than or equal to about 800° C., and any and all sub-ranges formed from any of the foregoing endpoints. It should be understood that when the nucleation treatment is described as occurring at a given temperature the temperature refers to the environment in which the nucleation treatment occurs, such as a kiln, furnace, or oven.

In embodiments, the nucleation treatment extends for a time period of greater than 10 minutes, such as greater than or equal to 30 minutes, greater than or equal to 1.0 hour, greater than or equal to 1.5 hours, greater than or equal to 2.0 hours, greater than or equal to 2.5 hours, greater than or equal to 3.0 hours, greater than or equal to 3.5 hours, or more. In embodiments, the nucleation extends for a time period from greater than or equal to 10 minutes to less than or equal to 12 hours, such as greater than or equal to 10 minutes to less than or equal to 4 hours, greater than or equal to 30 minutes to less than or equal to 3.5 hours, greater than or equal to 1.0 hours to less than or equal to about 3.0 hours, greater than or equal to 1.5 hours to less than or equal to about 2.5 hours, greater than or equal to 2.0 hours to less than or equal to about 4.0 hours, and any and all sub-ranges formed from any of the foregoing endpoints.

In embodiments, the ceramming treatment occurs at temperatures of greater than or equal to 900° C., such as greater than or equal to 910° C., greater than or equal to 920° C., greater than or equal to 930° C., greater than or equal to 940° C., greater than or equal to 950° C., greater than or equal to 960° C., greater than or equal to 970° C., greater than or equal to 980° C., greater than or equal to 990° C., or more. In embodiments, the ceramming treatment occurs at temperatures of greater than or equal to 900° C. to less than or equal to 1000° C., such as greater than or equal to 910° C. to less than or equal to 990° C., greater than or equal to 920° C. to less than or equal to 980° C., greater than or equal to 930° C. to less than or equal to 970° C., greater than or equal to 940° C. to less than or equal to 960° C., greater than or equal to 950° C. to less than or equal to 1000° C., and any and all sub-ranges formed from any of the foregoing endpoints. It should be understood that when the ceramming treatment is described as occurring at a given temperature the temperature refers to the environment in which the ceramming treatment occurs, such as a kiln, furnace, or oven.

In embodiments, the ceramming treatment extends for a time period of greater than 10 minutes, such as greater than or equal to 30 minutes, greater than or equal to 1.0 hour, greater than or equal to 1.5 hours, greater than or equal to 2.0 hours, greater than or equal to 2.5 hours, greater than or equal to 3.0 hours, greater than or equal to 3.5 hours, or more. In embodiments, the ceramming treatment extends for a time period from greater than or equal to 10 minutes to less than or equal to 4.0 hours, such as greater than or equal to 30 minutes to less than or equal to 3.5 hours, greater than or equal to 1.0 hours to less than or equal to about 3.0 hours, greater than or equal to 1.5 hours to less than or equal to about 2.5 hours, greater than or equal to 2.0 hours to less than or equal to about 4.0 hours, and any and all sub-ranges formed from any of the foregoing endpoints.

The ceramming of the precursor glass substrate to form the glass ceramic article may include an intermediate heat treatment. The intermediate heat treatment occurs between the nucleation treatment and the ceramming treatment, such that the nucleated glass substrate is subjected to the intermediate heat treatment. The intermediate heat treatment may occur at a temperature between the temperature of the nucleation treatment and the ceramming treatment. The intermediate heat treatment may be considered a secondary nucleation treatment and helps to ensure that the nucleated glass substrate is sufficiently nucleated to produce a glass ceramic with the desired transparency. In embodiments, the ceramming does not include an intermediate heat treatment.

Where the ceramming does not include an intermediate heat treatment the ceramming treatment may be performed at any of the temperatures described herein for the intermediate heat treatment and the ceramming treatment.

In embodiments, the intermediate treatment occurs at temperatures of greater than or equal to 800° C., such as greater than or equal to 810° C., greater than or equal to 820° C., greater than or equal to 830° C., greater than or equal to 840° C., greater than or equal to 850° C., greater than or equal to 860° C., greater than or equal to 870° C., greater than or equal to 880° C., greater than or equal to 890° C., or more. In embodiments, the intermediate treatment occurs at temperatures of greater than or equal to 800° C. to less than or equal to 900° C., such as greater than or equal to 810° C. to less than or equal to 890° C., greater than or equal to 820° C. to less than or equal to 880° C., greater than or equal to 830° C. to less than or equal to 870° C., greater than or equal to 840° C. to less than or equal to 860° C., greater than or equal to 850° C. to less than or equal to 900° C., and any and all sub-ranges formed from any of the foregoing endpoints. It should be understood that when the intermediate heat treatment is described as occurring at a given temperature the temperature refers to the environment in which the intermediate heat treatment occurs, such as a kiln, furnace, or oven.

In embodiments, the intermediate heat treatment extends for a time period of greater than 10 minutes, such as greater than or equal to 30 minutes, greater than or equal to 1.0 hour, greater than or equal to 1.5 hours, greater than or equal to 2.0 hours, greater than or equal to 2.5 hours, greater than or equal to 3.0 hours, greater than or equal to 3.5 hours, or more. In embodiments, the intermediate heat treatment extends for a time period from greater than or equal to 10 minutes to less than or equal to 4.0 hours, such as greater than or equal to 30 minutes to less than or equal to 3.5 hours, greater than or equal to 1.0 hours to less than or equal to about 3.0 hours, greater than or equal to 1.5 hours to less than or equal to about 2.5 hours, greater than or equal to 2.0 hours to less than or equal to about 4.0 hours, and any and all sub-ranges formed from any of the foregoing endpoints.

In embodiments, the glass ceramics are also chemically strengthened, such as by ion exchange, producing a glass ceramic that is damage resistant for applications such as, but not limited to, display covers. The chemical strengthening of the glass ceramic articles increases the strength of the glass ceramic articles, such as may be characterized by the ring-on-ring test herein. With reference to FIG. 1, the glass ceramic has a first region under compressive stress (e.g., first and second compressive layers 120, 122 in FIG. 1) extending from the surface to a depth of compression (DOC) of the glass ceramic and a second region (e.g., central region 130 in FIG. 1) under a tensile stress or central tension (CT) extending from the DOC into the central or interior region of the glass ceramic. As used herein, DOC refers to the depth at which the stress within the glass ceramic changes from compressive to tensile. At the DOC, the stress crosses from a positive (compressive) stress to a negative (tensile) stress and thus exhibits a stress value of zero.

According to the convention normally used in the art, compression or compressive stress is expressed as a negative (<0) stress and tension or tensile stress is expressed as a positive (>0) stress. Throughout this description, however, CS is expressed as a positive or absolute value—i.e., as recited herein, CS=|CS|. The compressive stress (CS) may have a maximum at the surface of the glass ceramic, and the CS may vary with distance d from the surface according to a function. Referring again to FIG. 1, a first compressive layer 120 extends from first surface 110 to a depth $d_1$ and a second compressive layer 122 extends from second surface 112 to a depth $d_2$. Compressive stress (including surface CS) is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass ceramic. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety.

The compressive stress of both compressive stress regions (120, 122 in FIG. 1) is balanced by stored tension in the central region (130) of the glass. The maximum central tension (CT) and DOC values are measured using a scattered light polariscope (SCALP) technique known in the art.

The lithium contained in the amorphous phase of the glass ceramic enables efficient and relatively low temperature ion exchange, such as by utilizing molten sodium nitrate and/or potassium nitrate salt baths. This is a departure from other β-quartz solid solution glass ceramics utilized a lithium for magnesium ion exchange for chemical strengthening and required a very high bath temperature (e.g. >700° C.) due to the slow mobility of magnesium ions.

In the ion exchange treatment, the glass ceramic articles are contacted with a molten salt bath. In embodiments, the glass ceramic articles may be submerged in the molten salt bath. In embodiments, the molten salt bath includes a molten nitrate salt. In embodiments, the molten nitrate salt may be $KNO_3$, $NaNO_3$, or combinations thereof. In embodiments, the molten salt bath may include less than or equal to 100 wt % $KNO_3$, such as less than or equal to 90 wt % $KNO_3$, less than or equal to 80 wt % $KNO_3$, less than or equal to 70 wt % $KNO_3$, less than or equal to 60 wt % $KNO_3$, less than or equal to 50 wt % $KNO_3$, less than or equal to 40 wt % $KNO_3$, less than or equal to 30 wt % molten $KNO_3$, less than or equal to 20 wt % molten $KNO_3$, less than or equal to 10 wt % molten $KNO_3$, or less. In embodiments, the molten salt bath may include greater than or equal to 10 wt % $NaNO_3$, such as greater than or equal to 20 wt % $NaNO_3$, greater than or equal to 30 wt % $NaNO_3$, greater than or equal to 40 wt % $NaNO_3$, greater than or equal to 50 wt % $NaNO_3$, greater than or equal to 60 wt % $NaNO_3$, greater than or equal to 70 wt % $NaNO_3$, greater than or equal to 80 wt % $NaNO_3$, greater than or equal to 90 wt % $NaNO_3$, or more. In embodiments the molten salt bath may include 100 wt % $NaNO_3$. In embodiments, the molten salt bath may additionally include silicic acid, such as less than or equal to 1 wt % silicic acid.

The glass ceramic may be exposed to the molten salt bath by dipping the glass ceramic into the molten salt bath. Upon exposure to the glass ceramic, the molten salt bath may, according to embodiments, be at a temperature of greater than or equal to 350° C. to less than or equal to 550° C., such as greater than or equal to 360° C. to less than or equal to 540° C., greater than or equal to 370° C. to less than or equal to 530° C., greater than or equal to 380° C. to less than or equal to 520° C., greater than or equal to 390° C. to less than or equal to 510° C., greater than or equal to 400° C. to less than or equal to 500° C., greater than or equal to 410° C. to less than or equal to 490° C., greater than or equal to 420° C. to less than or equal to 480° C., greater than or equal to 430° C. to less than or equal to 470° C., greater than or equal to 440° C. to less than or equal to 460° C., greater than or equal to 390° C. to less than or equal to 450° C., and any and all sub-ranges formed from any of the foregoing endpoints. The relatively low molten salt bath range allows the efficient ion exchange strengthening of the glass ceramics described herein, providing significant cost savings compared to other chemically strengthened β-quartz solid solution glass ceramics.

In embodiments, the glass ceramic may be exposed to the molten salt bath for a timer period greater than or equal to 30 minutes to less than or equal to 48 hours, such as greater than or equal to 30 minutes to less than or equal to 24 hours, greater than or equal to 1 hour to less than or equal to 44 hours, greater than or equal to 4 hours to less than or equal to 40 hours, greater than or equal to 8 hours to less than or equal to 36 hours, from greater than or equal to 12 hours to less than or equal to 32 hours, greater than or equal to 16 hours to less than or equal to 28 hours, greater than or equal to 20 hours to less than or equal to 24 hours, greater than or equal to 30 minutes to less than or equal to 8 hours, and all sub-ranges formed from any of the foregoing endpoints.

The ion exchanged glass ceramic article includes a compressive stress layer extending from the surface thereof to a depth of compression, as described above with reference to FIG. 1. In embodiments, the depth of compression is greater than or equal to 10 μm, such as greater than or equal to 15 μm, greater than or equal to 20 μm, greater than or equal to 25 μm, greater than or equal to 30 μm, greater than or equal to 35 μm, greater than or equal to 40 μm, greater than or equal to 45 μm, greater than or equal to 50 μm, greater than or equal to 55 μm, or more. In embodiments, the depth of compression is greater than or equal to 10 μm to less than or equal to 60 μm, such as greater than or equal to 15 μm to less than or equal to 55 μm, greater than or equal to 20 μm to less than or equal to 50 μm, greater than or equal to 25 μm to less than or equal to 45 μm, greater than or equal to 30 μm to less than or equal to 40 μm, greater than or equal to 35 μm to less than or equal to 50 μm, and any and all sub-ranges formed from any of the foregoing endpoints. In embodiments, the depth of compression is less than or equal to 0.2t, where t is the thickness of the glass ceramic article, such that the depth of compression may be greater than or equal to 10 μm to less than or equal to 0.2t.

The compressive stress layer of the ion exchanged glass ceramic article includes a maximum compressive stress. In embodiments, the maximum compressive stress is greater than or equal to 100 MPa, or more. In embodiments, the maximum compressive stress is greater than or equal to 100 MPa to less than or equal to 1000 MPa.

After an ion exchange process is performed, it should be understood that a composition at the surface of the ion exchanged glass ceramic may be different than the composition of the as-formed glass ceramic (i.e., the glass ceramic before it undergoes an ion exchange process). This results from one type of alkali metal ion in the as-formed glass ceramic, such as, for example $Li^+$, being replaced with larger alkali metal ions, such as, for example $Na^+$ or $K^+$. However, the composition of the ion exchanged glass ceramic article at or near the center thereof will, in embodiments, still have the composition of the as-formed glass ceramic. Similarly, the ion exchange process may alter the microstructure at the surface of the glass ceramic, such as by converting crystalline regions to amorphous regions or the opposite. The microstructure of the glass ceramic at or near the center of the depth of the ion exchanged glass ceramic article will, in embodiments, be the same as the microstructure of the as-formed glass ceramic. As a result, the composition and microstructure at the center of the ion exchanged glass ceramic article is expected to be the same as the composition and microstructure of the as-formed glass ceramic. For the purposes of this discussion, the center of the ion exchanged glass ceramic article refers to any portion of the interior of the ion exchanged glass ceramic article located a distance of at least half the thickness from all surfaces thereof.

Figure 2A:
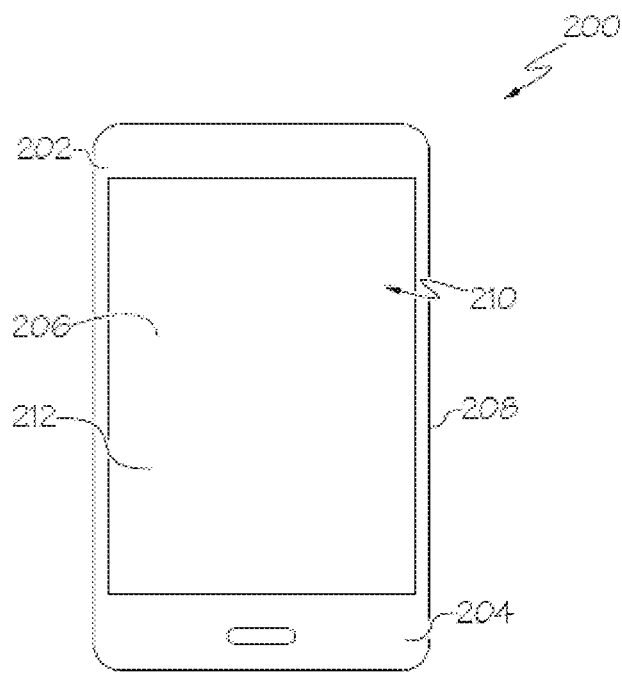
FIG. 2A is a plan view of an exemplary electronic device incorporating any of the glass ceramic articles disclosed herein.
Figure 2B:
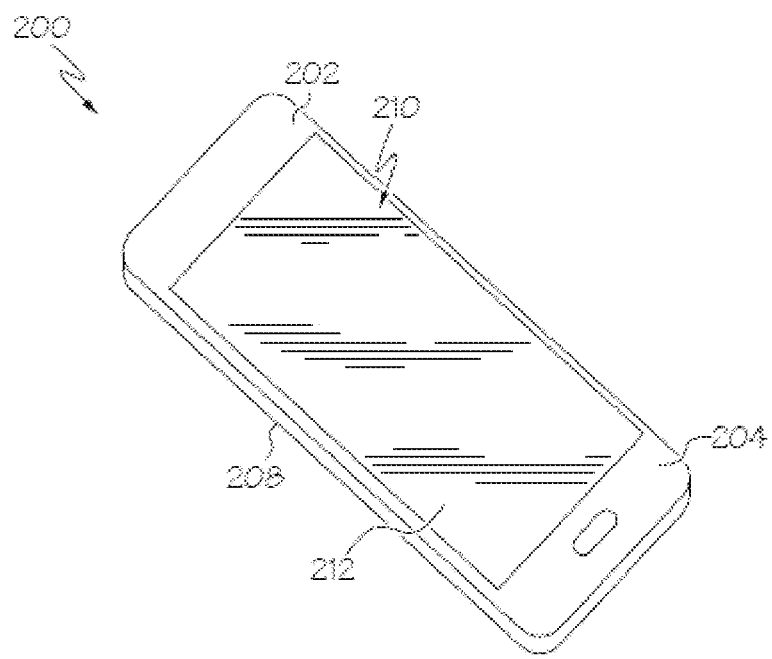
FIG. 2B is a perspective view of the exemplary electronic device of FIG. 2A.

The glass ceramic articles disclosed herein, in as-formed or ion exchanged form, may be incorporated into another article such as an article with a display (or display articles) (e.g., consumer electronics, including mobile phones, tablets, computers, navigation systems, and the like), architectural articles, transportation articles (e.g., automobiles, trains, aircraft, sea craft, etc.), appliance articles, or any article that requires some transparency, scratch-resistance, abrasion resistance or a combination thereof. An exemplary article incorporating any of the glass ceramic articles disclosed herein is shown in FIGS. 2A and 2B. Specifically, FIGS. 2A and 2B show a consumer electronic device 200 including a housing 202 having front 204, back 206, and side surfaces 208; electrical components (not shown) that are at least partially inside or entirely within the housing and including at least a controller, a memory, and a display 210 at or adjacent to the front surface of the housing; and a cover substrate 212 at or over the front surface of the housing such that it is over the display. In some embodiments, at least a portion of at least one of the cover substrate 212 and/or the housing 202 may include any of the glass articles disclosed herein.

EXAMPLES

Embodiments will be further clarified by the following examples. It should be understood that these examples are not limiting to the embodiments described above.

Precursor glass substrates having the compositions listed in Table 1 below were prepared and cerammed according to the indicated ceramming schedules to form glass ceramic articles. Where the ceramming schedule includes only two steps, no intermediate heat treatment was employed. In Table 1, all components are provided in mol %, the appearance is reported based on observation, the phase assemblage was determined based on x-ray diffraction (XRD) analysis, and the $K_{IC}$ fracture toughness was measured according to the chevron notch short bar (CNSB) method.

TABLE 1

| Example | 1 | 2 | 3 | 4 | 5 | 6 |
|---|---|---|---|---|---|---|
| $SiO_2$ | 74.8 | 71.0 | 75.2 | 73.1 | 72.9 | 75.0 |
| $Al_2O_3$ | 11.7 | 13.2 | 11.7 | 12.4 | 12.5 | 11.7 |
| $Li_2O$ | 4.3 | 4.1 | 4.1 | 4.1 | 4.2 | 4.2 |
| MgO | 5.8 | 9.1 | 6.8 | 8.0 | 7.4 | 6.3 |
| ZnO | 1.1 | 0.0 | 0.0 | 0.0 | 0.6 | 0.6 |
| $ZrO_2$ | 1.9 | 2.5 | 2.0 | 2.2 | 2.2 | 2.0 |
| $SnO_2$ | 0.3 | 0.2 | 0.2 | 0.2 | 0.2 | 0.2 |
| $(R_2O + R'O)/Al_2O_3$ | 0.96 | 1.00 | 0.93 | 0.98 | 0.98 | 0.95 |

TABLE 1-continued

| Example | 1 | 2 | 3 | 4 | 5 | 6 |
|---|---|---|---|---|---|---|
| Ceramming Schedule | 780° C. - 4 hr<br>850° C. - 4 hr<br>930° C. - 4 hr | 800° C. - 4 hr<br>880° C. - 4 hr | 780° C. - 4 hr<br>830° C. - 4 hr<br>900° C. - 4 hr | 750° C. - 4 hr<br>850° C. - 4 hr<br>900° C. - 4 hr | 750° C. - 4 hr<br>850° C. - 4 hr<br>900° C. - 4 hr | 750° C. - 4 hr<br>850° C. - 4 hr<br>900° C. - 4 hr |
| Appearance | Clear Transparent | Clear Transparent | Clear Transparent | Clear Transparent | Clear Transparent | Clear Transparent |
| Phase Assemblage | β-quartz t-zirconia | β-quartz t-zirconia | β-quartz t-zirconia | β-quartz t-zirconia | β-quartz t-zirconia | β-quartz t-zirconia |
| $K_{IC}$ (MPa√m) | 0.85 | | | | | |

Figure 3:
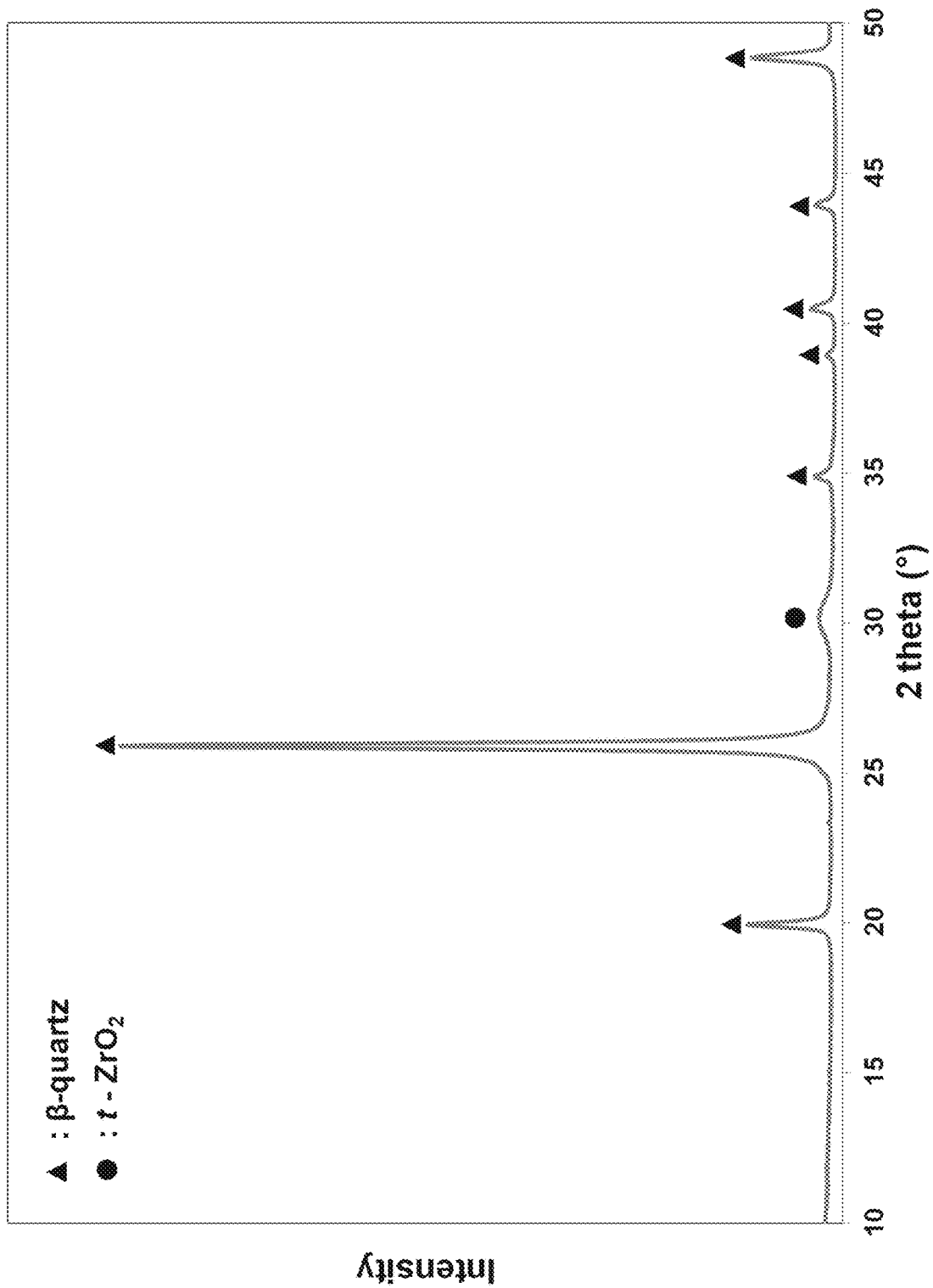
FIG. 3 is an x-ray diffraction analysis of a glass ceramic article according to an embodiment.

FIG. 3 shows the XRD plot of Example 1, indicating the presence of both β-quartz and tetragonal zirconia phases.

Figure 4:
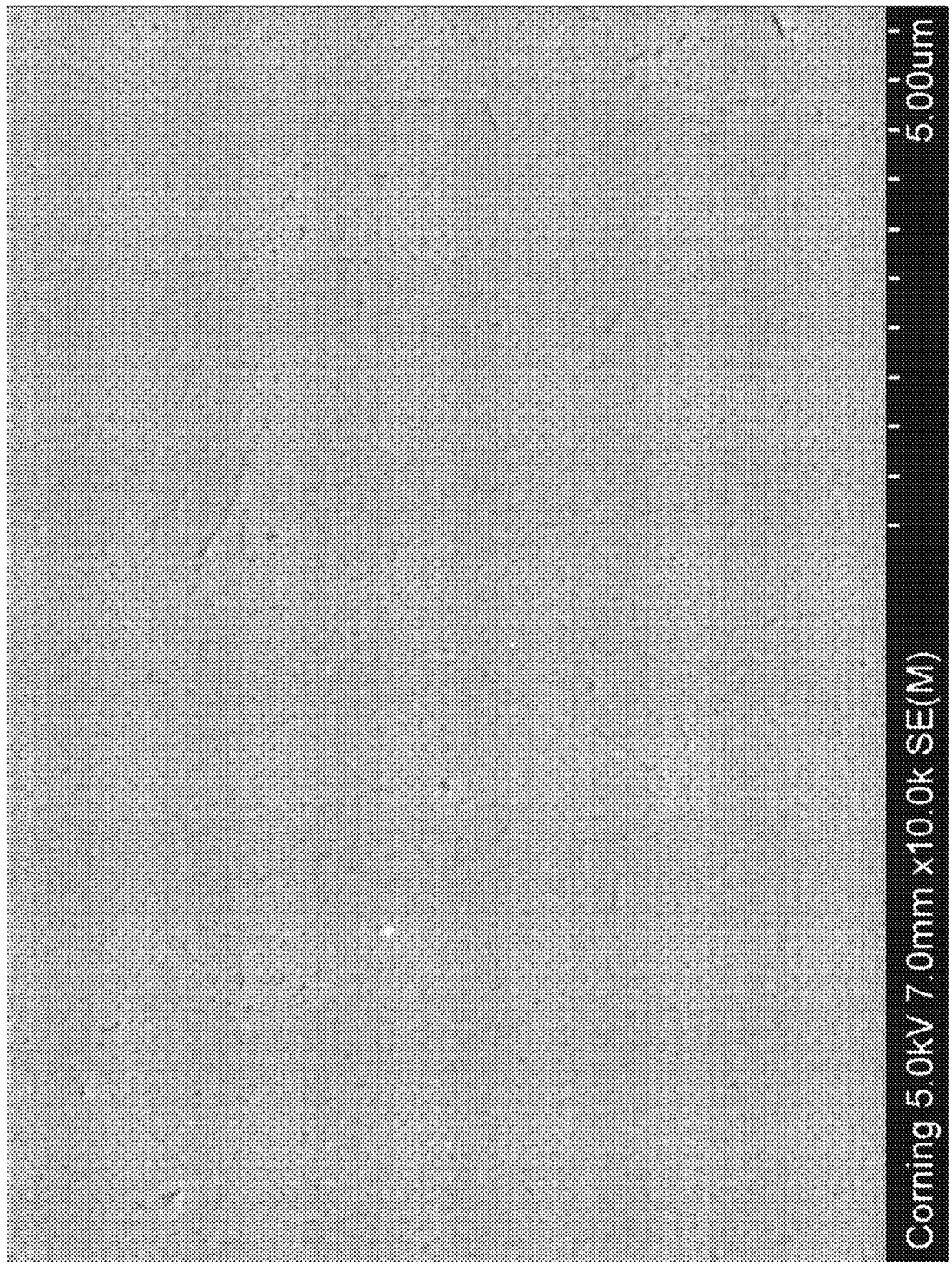
FIG. 4 is a scanning electron microscope image of a glass ceramic article according to an embodiment.
Figure 5:
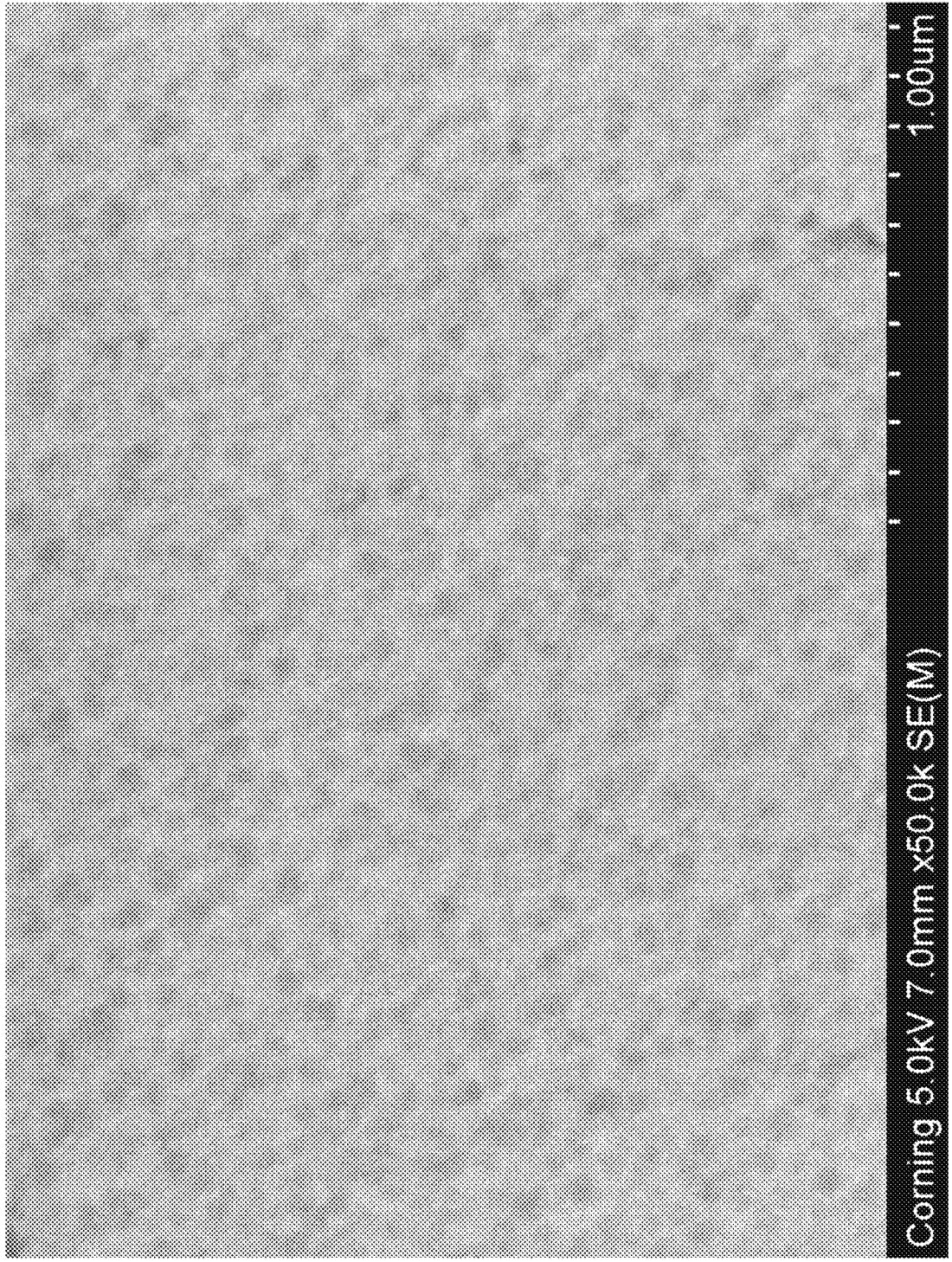
FIG. 5 is a scanning electron microscope image of the glass ceramic article of FIG. 4 at a higher magnification.

A sample of Example 1 was polished and then etched with 1% hydrofluoric acid for 1 minute. FIGS. 4 and 5 are scanning electron microscope (SEM) images of the polished and etched surface at different magnifications, showing the microstructure of the glass ceramic.

Figure 6:
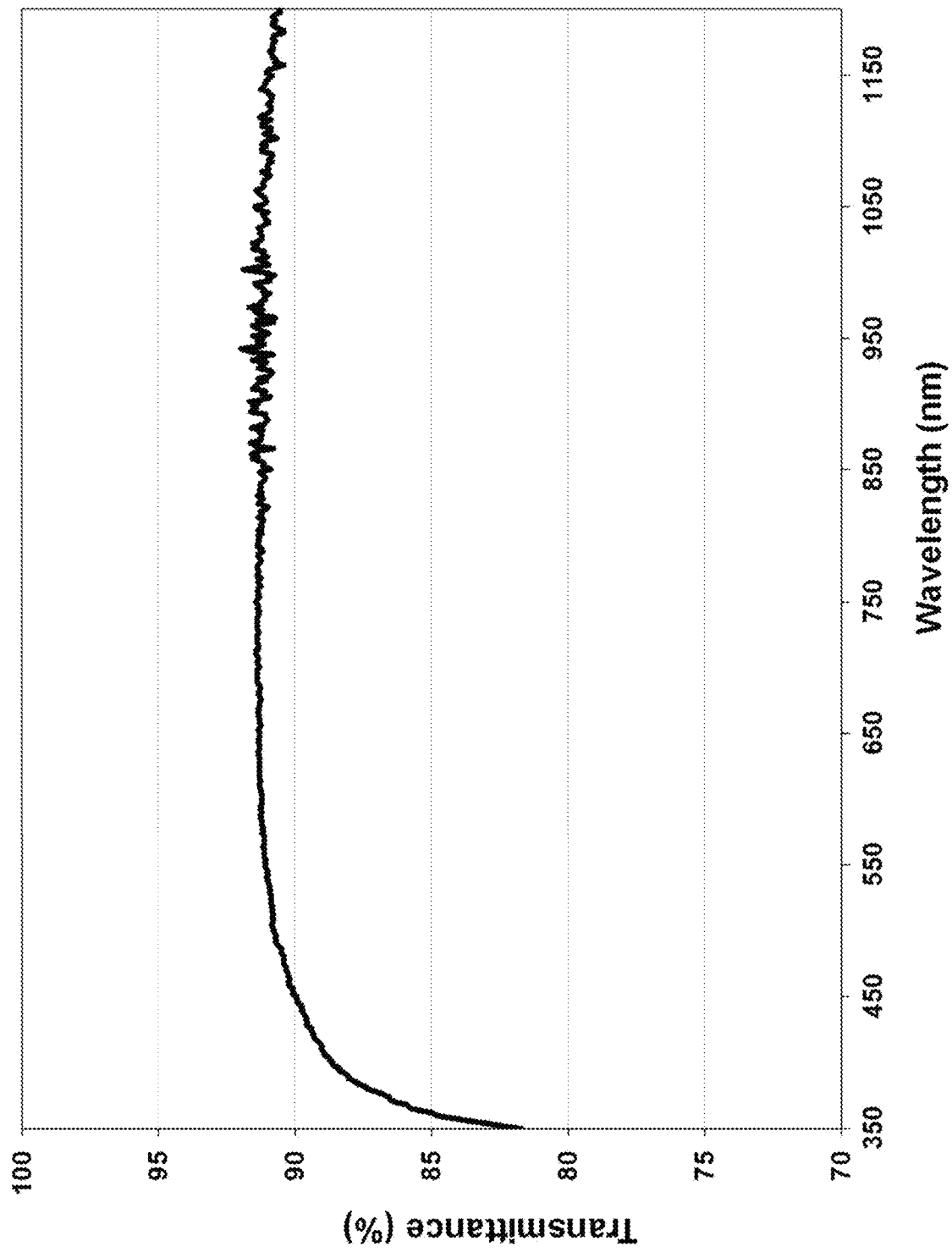
FIG. 6 is a plot of the measured transmittance as a function of wavelength of a glass ceramic article according to an embodiment.

The transmittance of a sample according to Example 1 with a thickness of 0.8 mm was measured as described above. The measured transmittance as a function of wavelength is shown in FIG. 6.

Figure 7:
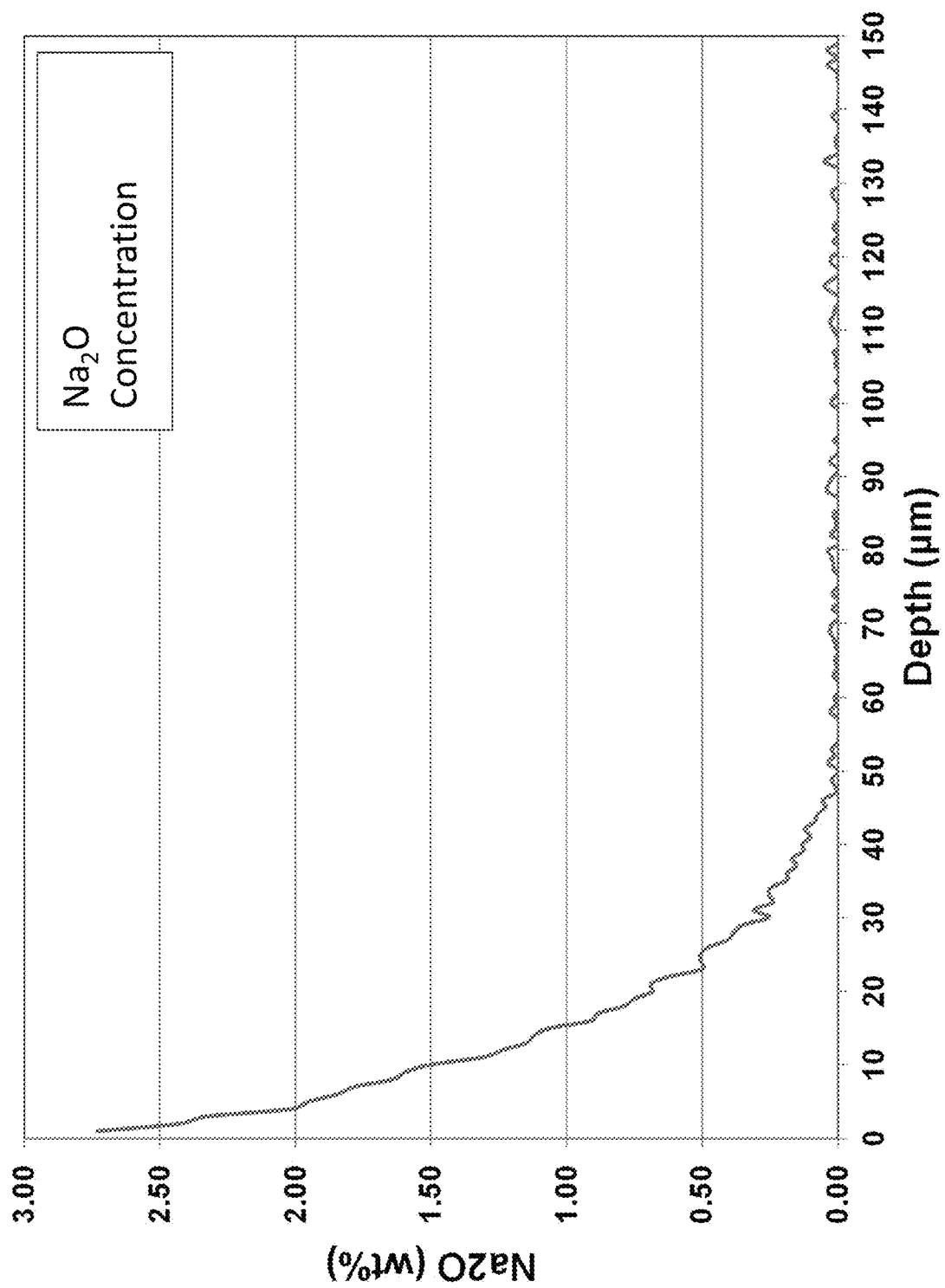
FIG. 7 is a plot of $Na_2O$ concentration as a function of depth below a surface of an ion exchanged glass ceramic article according to an embodiment.

A glass ceramic sample having the same composition as Example 1 in Table I was produced using a ceramming schedule with a nucleation treatment at 780° C. for 2 hours, an intermediate heat treatment at 850° C. for 2 hours, and a ceramming treatment at 930° C. for 2 hours. The sample was then ion exchanged in a molten salt bath including 100 wt % $NaNO_3$ at a bath temperature of 390° C. for a time of 3.5 hours to produce a chemically strengthened glass ceramic sample. The $Na_2O$ concentration as a function of depth below the surface of the chemically strengthened glass ceramic sample was measured by microprobe, with the result shown in FIG. 7. The depth of compression is approximated by the depth of the $Na_2O$ penetration, about 50 μm in FIG. 7.

Figure 8:
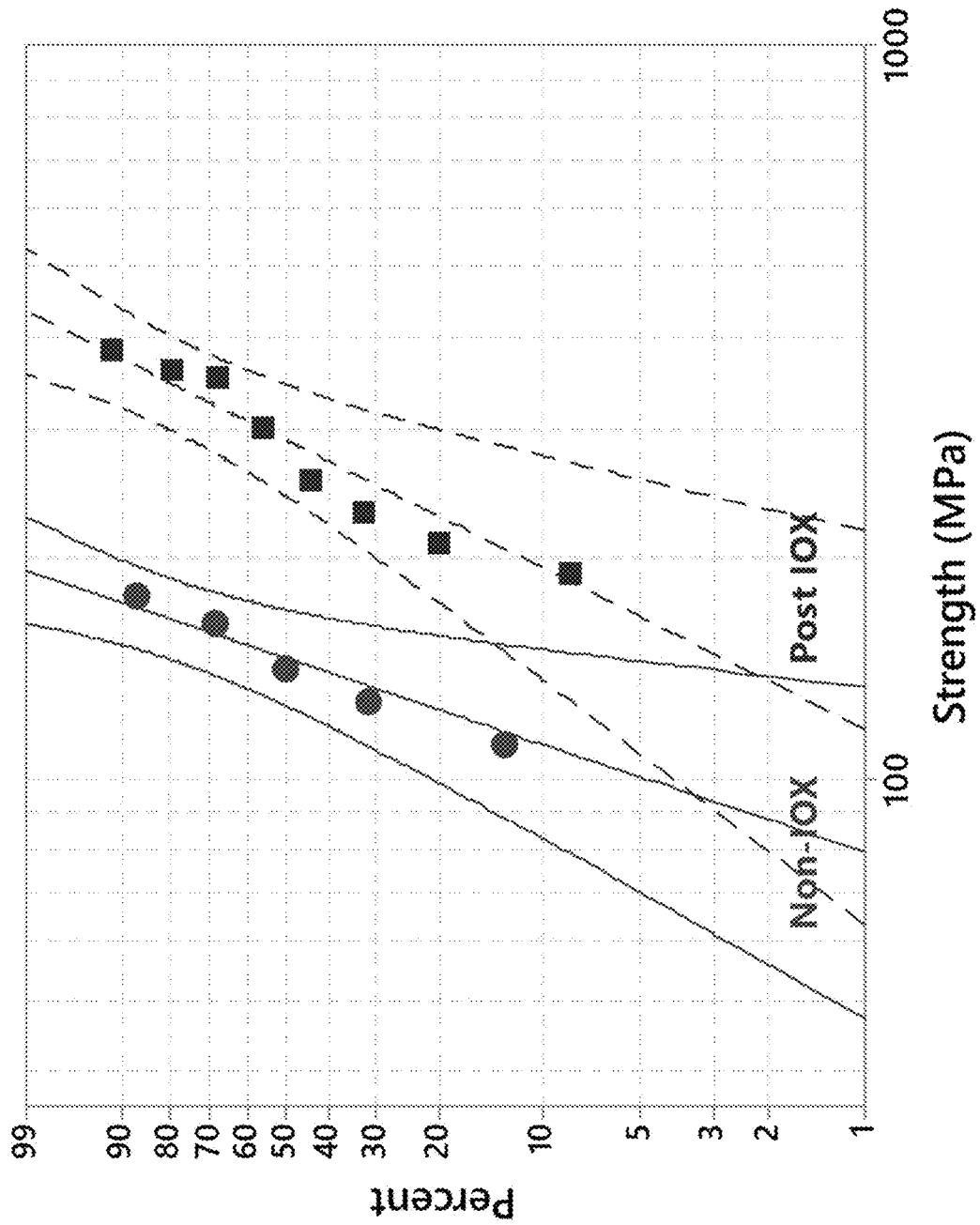
FIG. 8 is a Weibull plot of the ring-on-ring strength for a non-ion exchanged glass ceramic article and an ion exchanged glass ceramic article according to embodiments.

A sample produced according to Example 1 in Table I was produced with a thickness of 0.8 mm. The sample was then ion exchanged in a molten salt bath including 100 wt % $NaNO_3$ at a bath temperature of 430° C. for a time of 4 hours to produce a chemically strengthened glass ceramic sample. The non-ion exchanged sample and the ion exchanged sample were then subjected to a ring-on-ring test, with the results shown as a Weibull plot in FIG. 8. The square data points are the ion exchanged sample and the round data points are the non-ion exchanged sample. As shown in FIG. 8, the ion exchanged sample exhibited a ring-on-ring strength approximately double that of the non-ion exchanged sample.

The ring-on-ring (ROR) test is a surface strength measurement for testing flat glass ceramic specimens, and ASTM C1499-09(2013), entitled "Standard Test Method for Monotonic Equibiaxial Flexural Strength of Advanced Ceramics at Ambient Temperature," serves as the basis for the ROR test methodology described herein. The contents of ASTM C1499-09 are incorporated herein by reference in their entirety.

Figure 9:
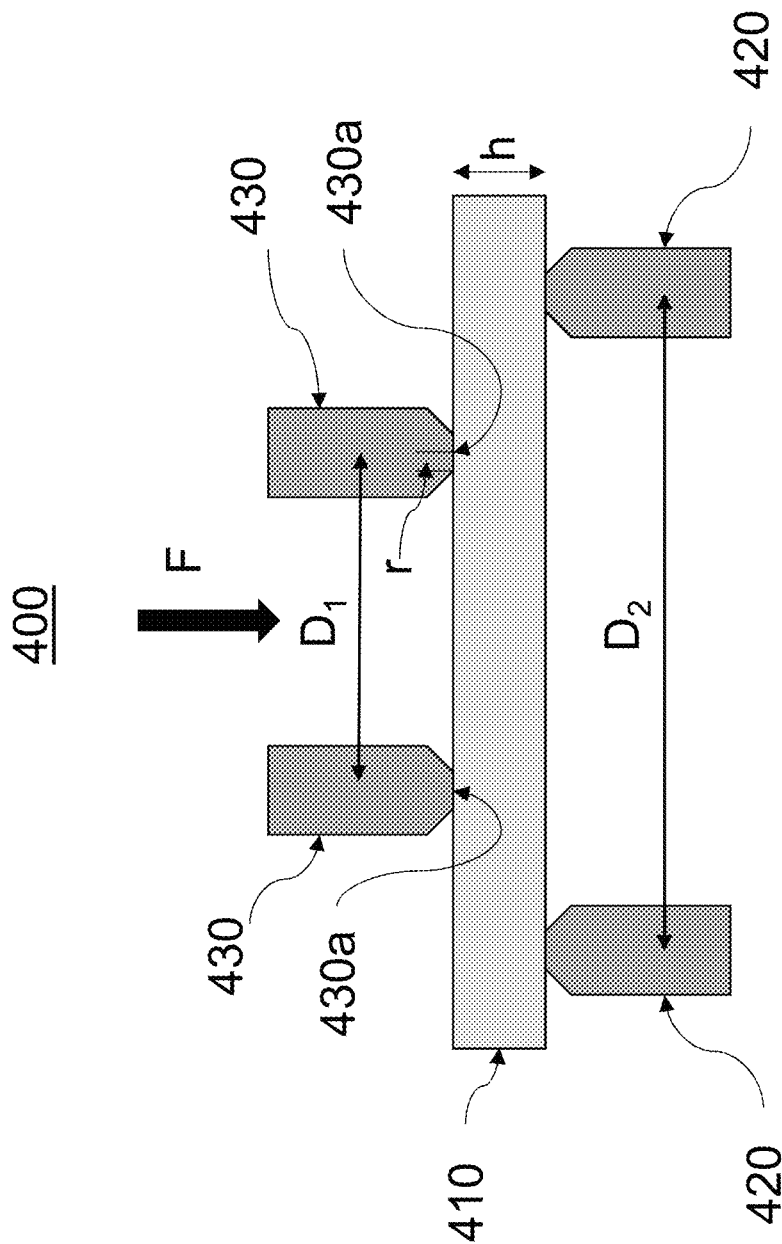
FIG. 9 is a schematic depiction of a ring-on-ring testing apparatus.

For the ROR test, a sample is placed between two concentric rings of differing size to determine equibiaxial flexural strength (i.e., the maximum stress that a material is capable of sustaining when subjected to flexure between two concentric rings), as shown in FIG. 9. In the ROR configuration 400, the glass-based article 410 is supported by a support ring 420 having a diameter D2. A force F is applied by a load cell (not shown) to the surface of the glass-based article by a loading ring 430 having a diameter D1.

The ratio of diameters of the loading ring and support ring D1/D2 may be in a range from 0.2 to 0.5. In some embodiments, D1/D2 is 0.5. Loading and support rings 130, 120 should be aligned concentrically to within 0.5% of support ring diameter D2. The load cell used for testing should be accurate to within ±1% at any load within a selected range. Testing is carried out at a temperature of 23±2° C. and a relative humidity of 40±10%.

For fixture design, the radius r of the protruding surface of the loading ring 430 is in a range of h/2≤r≤3h/2, where h is the thickness of glass-based article 410. Loading and support rings 430, 420 are made of hardened steel with hardness HRc>40. ROR fixtures are commercially available.

The intended failure mechanism for the ROR test is to observe fracture of the glass-based article 410 originating from the surface 430a within the loading ring 430. Failures that occur outside of this region—i.e., between the loading ring 430 and support ring 420—are omitted from data analysis. Due to the thinness and high strength of the glass-based article 410, however, large deflections that exceed ½ of the specimen thickness h are sometimes observed. It is therefore not uncommon to observe a high percentage of failures originating from underneath the loading ring 430. Stress cannot be accurately calculated without knowledge of stress development both inside and under the ring (collected via strain gauge analysis) and the origin of failure in each specimen. ROR testing therefore focuses on peak load at failure as the measured response.

The strength of a glass-based article depends on the presence of surface flaws. However, the likelihood of a flaw of a given size being present cannot be precisely predicted, as the strength of glass is statistical in nature. A probability distribution can therefore be used as a statistical representation of the data obtained.

All compositional components, relationships, and ratios described in this specification are provided in mol % unless otherwise stated. All ranges disclosed in this specification include any and all ranges and subranges encompassed by the broadly disclosed ranges whether or not explicitly stated before or after a range is disclosed.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A glass ceramic article, comprising:
   a primary crystal phase comprising (β-quartz solid solution;

a secondary crystal phase comprising tetragonal $ZrO_2$; and a lithium aluminosilicate amorphous phase, wherein a molar ratio $(R_2O+R'O)/Al_2O_3$ is from greater than or equal to 0.9 to less than or equal to 1.3, $R_2O$ is $Li_2O+Na_2O+K_2O+Cs_2O+Rb_2O$, and R'O is $MgO+CaO+SrO+BaO+ZnO$.

2. The glass ceramic article of claim 1, wherein the glass ceramic article has a crystallinity of greater than 50 wt %.

3. The glass ceramic article of claim 1, wherein the primary crystal phase has a crystallite size of from greater than or equal to 50 nm to less than or equal to 100 nm.

4. The glass ceramic article of claim 1, wherein the glass ceramic article has a transmittance of greater than or equal to 90% at a thickness of 0.8 mm over a wavelength range of from 400 nm to 750 nm.

5. The glass ceramic article of claim 1, comprising greater than or equal to 65 mol % to less than or equal to 80 mol % $SiO_2$.

6. The glass ceramic article of claim 1, comprising greater than or equal to 8 mol % to less than or equal to 20 mol % $Al_2O_3$.

7. The glass ceramic article of claim 1, comprising greater than or equal to 4 mol % to less than or equal to 18 mol % MgO.

8. The glass ceramic article of claim 1, comprising greater than or equal to 0 mol % to less than or equal to 4 mol % ZnO.

9. The glass ceramic article of claim 1, comprising greater than or equal to 1 mol % to less than or equal to 4 mol % $ZrO_2$.

10. The glass ceramic article of claim 1, comprising greater than or equal to 0 mol % to less than or equal to 0.4 mol % $SnO_2$.

11. The glass ceramic article of claim 1, comprising greater than or equal to 0 mol % to less than or equal to 1 mol % $TiO_2$.

12. The glass ceramic article of claim 1, wherein the glass ceramic article is substantially free of $Bi_2O_3$ and $B_2O_3$.

13. The glass ceramic article of claim 1, wherein the molar ratio $(R_2O+R'O)/Al_2O_3$ is from greater than or equal to 0.9 to less than or equal to 1.1.

14. The glass ceramic article of claim 1, comprising greater than or equal to 2 mol % to less than or equal to 8 mol % $Li_2O$.

15. The glass ceramic article of claim 1, comprising: greater than or equal to 0 mol % to less than or equal to 5 mol % $Na_2O$; and greater than or equal to 0 mol % to less than or equal to 5 mol % $K_2O$.

16. The glass ceramic article of claim 1, comprising a compressive stress layer extending from a surface to a depth of compression.

17. A consumer electronic product, comprising:

a housing comprising a front surface, a back surface and side surfaces;

electrical components at least partially within the housing, the electrical components comprising a controller, a memory, and a display, the display at or adjacent the front surface of the housing; and a cover substrate disposed over the display, wherein at least a portion of at least one of the housing or the cover substrate comprises the glass ceramic article of claim 1.

18. A method of producing a glass ceramic article, comprising:

nucleating a glass substrate to form a nucleated glass substrate; ceramming the nucleated glass substrate to form the glass ceramic article, wherein the glass substrate comprises a lithium aluminosilicate, and the glass ceramic article comprises: a primary crystal phase comprising β-quartz solid solution; a secondary crystal phase comprising tetragonal $ZrO_2$; and a lithium aluminosilicate amorphous phase, wherein a molar ratio $(R_2O+R'O)/Al_2O_3$ is from greater than or equal to 0.9 to less than or equal to 1.3, $R_2O$ is $Li_2O+Na_2O+K_2O+Cs_2O+Rb_2O$, and R'O is $MgO+CaO+SrO+BaO+ZnO$.

19. The method of claim 18, wherein the nucleating comprises treatment in an environment at a temperature greater than or equal to 700° C. to less than or equal to 800° C., and the nucleating extends for a time period of greater than or equal to 10 minutes to less than or equal to 12 hours.

20. The method of claim 18, wherein the ceramming comprises treatment in an environment at a temperature greater than or equal to 900° C. to less than or equal to 1000° C., and the ceramming extends for a time period of greater than or equal to 10 minutes to less than or equal to 4 hours.

21. The method of claim 18, further comprising an intermediate heat treatment of the nucleated glass substrate, wherein the intermediate heat treatment takes place after the nucleating and before the ceramming and comprises treatment in an environment at a temperature greater than the nucleating and less than the ceramming.

22. The method of claim 21, wherein the intermediate heat treatment comprises treatment in the environment at the temperature, the temperature is from greater than or equal to 800° C. to less than or equal to 900° C., and the intermediate heat treatment extends for a time period of greater than or equal to 10 minutes to less than or equal to 4 hours.

23. The method of claim 18, further comprising ion exchanging the glass ceramic article in a molten salt bath, wherein the molten salt bath comprises $NaNO_3$, $KNO_3$, or combinations thereof.

24. The method of claim 18, wherein the glass substrate comprises:

greater than or equal to 65 mol % to less than or equal to 80 mol % $SiO_2$;

greater than or equal to 8 mol % to less than or equal to 20 mol % $Al_2O_3$;

greater than or equal to 2 mol % to less than or equal to 8 mol % $Li_2O$;

greater than or equal to 4 mol % to less than or equal to 18 mol % MgO;

greater than or equal to 0 mol % to less than or equal to 4 mol % ZnO;

greater than or equal to 1 mol % to less than or equal to 4 mol % $ZrO_2$; and greater than or equal to 0 mol % to less than or equal to 0.4 mol % $SnO_2$, wherein the molar ratio $(R_2O+R'O)/Al_2O_3$ is from greater than or equal to 0.9 to less than or equal to 1.3.

* * * * *

UNITED STATES PATENT AND TRADEMARK OFFICE
CERTIFICATE OF CORRECTION

| | | |
|---|---|---|
| PATENT NO. | : 11,708,299 B2 | Page 1 of 1 |
| APPLICATION NO. | : 17/537760 | |
| DATED | : July 25, 2023 | |
| INVENTOR(S) | : George Halsey Beall et al. | |

It is certified that error appears in the above-identified patent and that said Letters Patent is hereby corrected as shown below:

In the Claims

In Column 20, Line 66, in Claim 1, delete "(β-quartz" and insert -- β-quartz --.

Signed and Sealed this
Fifth Day of December, 2023

Katherine Kelly Vidal
*Director of the United States Patent and Trademark Office*